US008515846B1

(12) United States Patent
Forsythe

(10) Patent No.: US 8,515,846 B1
(45) Date of Patent: Aug. 20, 2013

(54) SYSTEM AND METHOD FOR FREE-CASH-FLOW WEIGHTING OF INDEX FUNDS

(75) Inventor: Gregory J Forsythe, Crown Point, IN (US)

(73) Assignee: Charles Schwab & Co., Inc., San Francisco, CA (US)

( * ) Notice: Subject to any disclaimer, the term of this patent is extended or adjusted under 35 U.S.C. 154(b) by 1401 days.

(21) Appl. No.: 11/879,954

(22) Filed: Jul. 18, 2007

Related U.S. Application Data

(60) Provisional application No. 60/832,026, filed on Jul. 19, 2006.

(51) Int. Cl.
*G06Q 40/00* (2006.01)

(52) U.S. Cl.
USPC ...................................................... 705/36 R

(58) Field of Classification Search
USPC ...................................................... 705/36 R
See application file for complete search history.

(56) References Cited

U.S. PATENT DOCUMENTS

2006/0149645 A1* 7/2006 Wood .............................. 705/35

OTHER PUBLICATIONS

Investopedia—Free Cash Flow, Admitted Prior Art in Arguments/Remarks submitted Mar. 22, 2011, p. 11-12.*
McClure, Ben. "Free Cash Flow: Free, But Not Always Easy." Investopedia.com, Sep. 17, 2003.*
Arnott, Robert D., Jason Hsu, and Philip Moore, Fundamental Indexation, Financial Analysts Journal, Mar./Apr. 2005, p. 83-99, ABI/INFORM Global, 17 pages.

* cited by examiner

*Primary Examiner* — Lindsay M. Maguire
(74) *Attorney, Agent, or Firm* — Innovation Partners; Charles E. Gotlieb

(57) ABSTRACT

A system and method selects securities and weights them for an index fund using free cash flow as a factor in one or both of the selection and weighting. Dividend adjusted free cash flow, a type of free cash flow, may be used instead of the conventional definition of free cash flow.

22 Claims, 2 Drawing Sheets

SYSTEM AND METHOD FOR FREE-CASH-FLOW WEIGHTING OF INDEX FUNDS

RELATED APPLICATIONS

This application claims the benefit of U.S. provisional patent application Ser. No. 60/832,026, entitled Method and Apparatus for Free-Cash-Flow Weighting of Index Funds filed by Gregory J. Forsythe on Jul. 19, 2006, and having the same assignee as the present application, and is hereby incorporated by reference in its entirety.

FIELD OF THE INVENTION

The present invention is related to computer software and more specifically to financial services computer software.

BACKGROUND OF THE INVENTION

Index funds are funds that are managed according to a formula. In this regard they are considered "passively managed" because they are not managed according to the skill or intuition of the manager. Instead, a formula is applied to determine what securities will be included in the fund, and a similar formula is used to identify the proportion of each security to be included in the fund.

Some index funds are capitalization-weighted. In such a fund, stocks meeting a criteria (e.g. "common stock of 100 companies publicly traded on one of the major exchanges with the largest market capitalization") are selected for inclusion in the fund. The proportion of securities of a given company that will be included in the index (e.g. the weight of the company) may be determined at least in part using a formula that includes the market capitalization of each of the included securities or each company corresponding to the security. For example, the proportion may be by identified by summing the total value of all of the common stocks of each included company to identify a sum, and dividing the market value of the common stock of a particular company by the identified sum to identify the ratio of that company's common stock that will be included in the index fund. The calculation process is performed for every security in the fund. The amount of each security is its proportion multiplied by the dollar value invested in the fund.

Other variations may be used. For example, rather than using market capitalization alone, several factors may be used to determine which securities will be included, as well as their respective proportions in the fund.

Capitalization-weighted funds are inexpensive to manage. The fund may be rebalanced at certain times of the year or at other times to comply with the formulas used to determine the proportion of securities. The rebalancing process adjusts the proportions based on a recent computation using the formula in the same manner described above. In addition, the rules of inclusion are used to determine whether securities should be added or removed from the fund, either at the same time as the fund is rebalanced, or at different times. Because both of these are performed according to a formula, they can be managed by administrators rather than high paid stock pickers, without expensive research.

However, capitalization-weighted funds suffer when speculative run-ups of a security cause it to be purchased in a higher proportion than would be desirable. During periods in which a stock falls out of favor, it will be purchased in lower proportion than might be desirable based on fundamentals alone. Thus, capitalization-weighted funds may provide suboptimal returns.

Index funds have been proposed that do not use market capitalization as a factor, or as the only factor, in either the determination of which securities are included, the formula used to determine the proportion of securities relative to others in the fund, or both. Such non-capitalization-weighted funds avoid the drawbacks of capitalization-weighted index funds, but the factors thus far proposed may still not maximize investor returns.

What is needed is a system and method that uses a weight other than capitalization that can improve investor returns.

SUMMARY OF INVENTION

A system and method uses free cash flow as the factor or as one of the factors in selecting and weighting securities in an index fund. "Dividend adjusted free cash flow", defined as cash flow from operations, which may be a line item on a company's annual report, less dividends paid, less capital expenditures, may be used as the free cash flow factor. This differs from the conventional definition of free cash flow, which is defined as net income from continuing operations, plus depreciation, less capital expenditures.

DETAILED DESCRIPTION OF A PREFERRED EMBODIMENT

Figure 1:
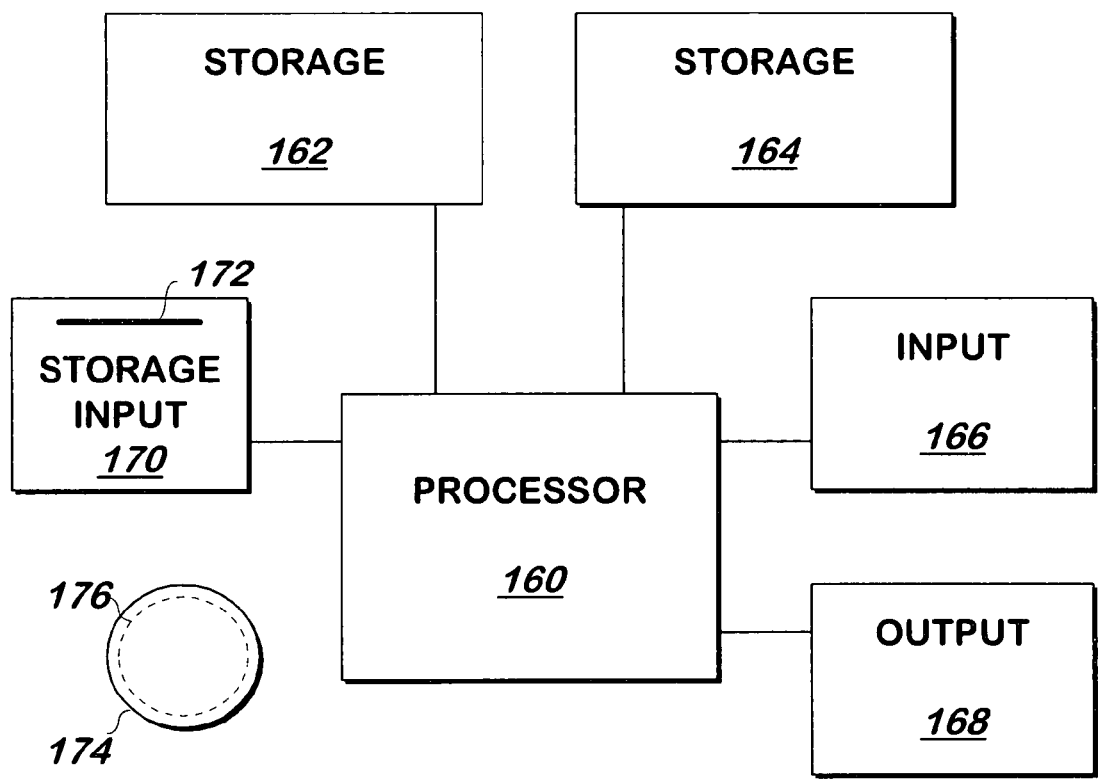
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
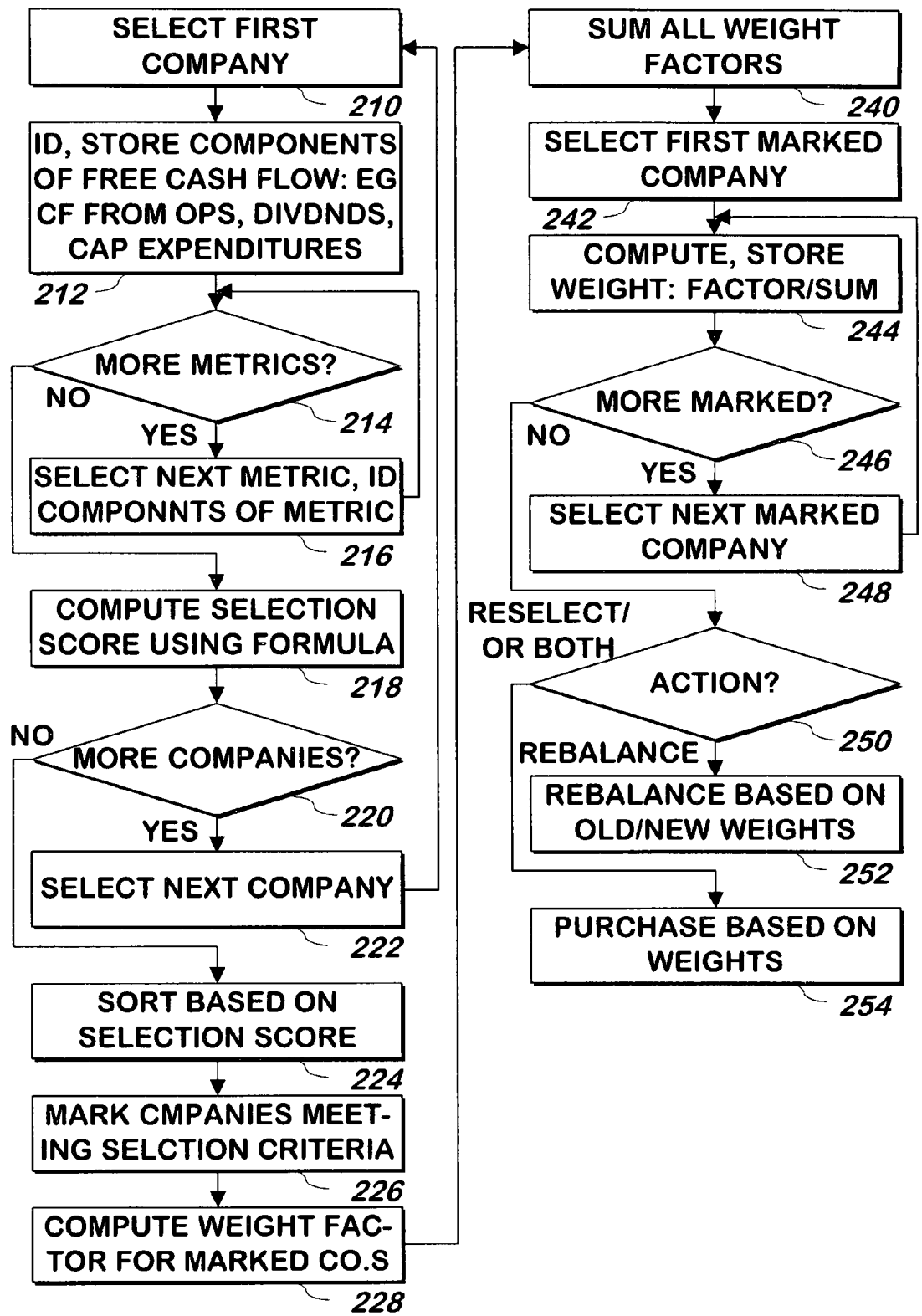
FIG. 2 is a flow chart illustrating a method of selecting and weighting securities for an index fund according to one embodiment of the present invention.

Referring now to FIG. 2, a method of identifying the securities to include in an index fund, and the proportion of each security to be included in the index, is shown according to one embodiment of the present invention. A first company is selected 210. Regarding the selected company, one or more components of a metric are identified and stored 212. In one embodiment, the metric is free cash flow and the components of free cash flow include cash flow from operations, dividends, and capital expenditures. Free cash flow may be the only metric used to determine which securities will be included in the index fund, or there may be other metrics in addition to free cash flow, such as dividend-adjusted free cash flow. If there are more metrics 214, either those used for selection of companies or entities to be included in the index, or those used to compute the weighting of the included companies or other entities in the index, the next metric is selected and the one or more components of the metric for the selected company are identified and stored 216. It is noted that any or all metrics may be used to identify whether to include a company or other entity and to identify its weight in the index. The method continues at step 214 until no more metrics are to be used. The components of the metrics may be stored associated with the name or other identifier of the company, such as by storing such information in a conventional database.

In one embodiment, other metrics may include capitalization of common stock, or all stock. Gross revenue, equity book value, gross sales, gross dividends, cash flow, total employment, any line item from an annual report using generally accepted accounting principles, or other information contained in an annual report or being capable of derivation from publicly available information such as annual, quarterly, or other reports (e.g. insider trading), may be used as a metric, and any of these may be used as a weight factor as described below.

A selection score may be computed using any or all of the components of any or all of the metrics as part of a formula 218. In one embodiment, the selection score is the dividend-adjusted free cash flow for the company, the conventional free cash flow for the company or some combination of these, but other formulas may be used to compute the selection score including any or all of the metrics described above.

If there are additional companies or other types of entities for which components of free cash flow or other metrics may be identified 220, the next company is selected 222 and the method continues at step 212. In one embodiment, companies available for selection at steps 210 and 222 are any entity for which the one or more components of each metric are available through public or other sources. For example, a mutual fund or index fund having a known make-up may be used by computing the components of the metrics from the companies that make up the fund.

If there are no additional companies or other entities 220, the companies are sorted based on the selection score 224, and companies meeting a selection criteria (e.g. companies having the top 100 selection scores) are marked or otherwise identified 226. In one embodiment, the companies that meet the selection criteria are those with the highest selection score.

There are many ways of identifying which companies will be included in the index, and the above description is just one possible way. In another embodiment, the companies to be included in the index are those already included in a different index, such as the S&P 500. In still another embodiment, the companies that are selected in steps 210 and 222 are not all publicly traded companies, but may be a subset of such companies, such as an index such as the S&P 500 and the companies with the top 200 selection scores from among this more limited set are the ones marked in step 226. In still another embodiment, the selection criteria of step 226 includes all members of another index, plus the N companies with the top selection scores that are not in the other index. For example, if the S&P 500 is used as the other index, and N=100, the companies marked in step 226 would be all members of the S&P 500 plus 100 other companies with the highest selection scores that are not already marked by virtue of their being in the S&P 500. In such embodiment, one of the metrics described above may be inclusion in another index, such as the S&P 500.

A weight factor is computed for each of the companies marked in step 226 for use as described below 228. Any formula including some or all of the metrics described above may be used to compute the weight factor. In one embodiment, the weight factor is the free cash flow using the conventional definition described above, or the dividend-adjusted free cash flow, though in other embodiments, the weight factor includes either or both of these and may include other metrics as well, such as those metrics described above. The weight factors for all marked companies are summed 240. The first marked company is selected 242, and the weight for the selected company is computed and stored 244. In one embodiment, the weight for each selected company is computed as the weight factor for that company divided by the sum identified in step 240, though other ways of computing the weight for a company may be used. If there are more marked companies 246, the next such marked company is selected 248, and the method continues at step 244 using the newly selected company. Otherwise 246, if the index fund is solely being rebalanced 250, the fund is rebalanced based on the old and new weights 252. If the included securities of the fund are being changed, securities in the companies identified for inclusion may be purchased or sold based on the weights 254. If the index fund has been operating, as securities are added or removed from the index, they are purchased in proportion to their weight or sold. If the index fund is new, securities in the marked companies are purchased based on the weights. The rebalancing of the index may happen daily, hourly, continuously throughout the trading day, or at other times.

What is claimed is:

1. A method of selecting and weighting securities for an index, comprising:
identifying a first metric comprising at least one measure of free cash flow for each of a first plurality of securities;
for each of the plurality of securities, determining a selection score;

identifying a subset of the first plurality of securities responsive to the selection score, the subset comprising a second plurality of securities selected for inclusion in the index; and identifying, responsive to the first metric comprising at least one measure of free cash flow for each of the second plurality of securities, the weight for each of the second plurality of securities, the weight identifying a relative proportion of said security for the index.

2. The method of claim 1 wherein the identifying the subset is responsive to a second metric, comprising at least one measure of free cash flow.

3. The method of claim 2, wherein the first metric comprises the second metric.

4. The method of claim 2, wherein one selected from the group comprising the first metric and the second metric comprises dividend-adjusted free cash flow.

5. The method of claim 2, wherein at least one selected from the group comprising the first metric and the second metric additionally comprises a measure of capitalization of at least some stock corresponding to the respective security.

6. The method of claim 2, wherein at least one selected from the group comprising the first metric and the second metric additionally comprises gross revenue corresponding to the respective security.

7. The method of claim 2, wherein at least one selected from the group comprising the first metric and the second metric additionally comprises a measure of book value corresponding to the respective security.

8. The method of claim 2, wherein at least one selected from the group comprising the first metric and the second metric additionally comprises a line item from an annual report corresponding to the respective security.

9. The method of claim 2, wherein at least one selected from the group comprising the first metric and the second metric additionally comprises a measure of employment corresponding to the respective security.

10. The method of claim 1, wherein both the first metric and the second metric comprise dividend-adjusted free cash flow.

11. The method of claim 1, wherein the selection score is additionally responsive to whether the respective security is part of a different index.

12. A computer program product comprising a non transitory computer useable medium having computer readable program code embodied therein for selecting and weighting securities for an index, the computer program product comprising computer readable program code devices configured to cause a computer system to:

identify a first metric comprising at least one measure of free cash flow for each of a first plurality of securities;

for each of the plurality of securities, determine a selection score;

identify a subset of the first plurality of securities responsive to the selection score, the subset comprising a second plurality of securities selected for inclusion in the index; and identify, responsive to the first metric comprising at least one measure of free cash flow for each of the second plurality of securities, the weight for each of the second plurality of securities, the weight identifying a relative proportion of said security for the index.

13. The computer program product of claim 12 wherein the computer readable program code devices configured to cause the computer system to identify the subset are responsive to a second metric, comprising at least one measure of free cash flow.

14. The computer program product of claim 13, wherein the first metric comprises the second metric.

15. The computer program product of claim 13, wherein one selected from the group comprising the first metric and the second metric comprises dividend-adjusted free cash flow.

16. The computer program product of claim 13, wherein at least one selected from the group comprising the first metric and the second metric additionally comprises a measure of capitalization of at least some stock corresponding to the respective security.

17. The computer program product of claim 13, wherein at least one selected from the group comprising the first metric and the second metric additionally comprises gross revenue corresponding to the respective security.

18. The computer program product of claim 13, wherein at least one selected from the group comprising the first metric and the second metric additionally comprises a measure of book value corresponding to the respective security.

19. The computer program product of claim 13, wherein at least one selected from the group comprising the first metric and the second metric additionally comprises a line item from an annual report corresponding to the respective security.

20. The computer program product of claim 13, wherein at least one selected from the group comprising the first metric and the second metric additionally comprises a measure of employment corresponding to the respective security.

21. The computer program product of claim 12, wherein both the first metric and the second metric comprise dividend-adjusted free cash flow.

22. The computer program product of claim 12, wherein the selection score is additionally responsive to whether the respective security is part of a different index.

* * * * *